Oct. 30, 1962　　　　　M. WATTER　　　　3,060,561
METHOD OF FORMING CURVED SANDWICH PANELS
Filed July 27, 1959
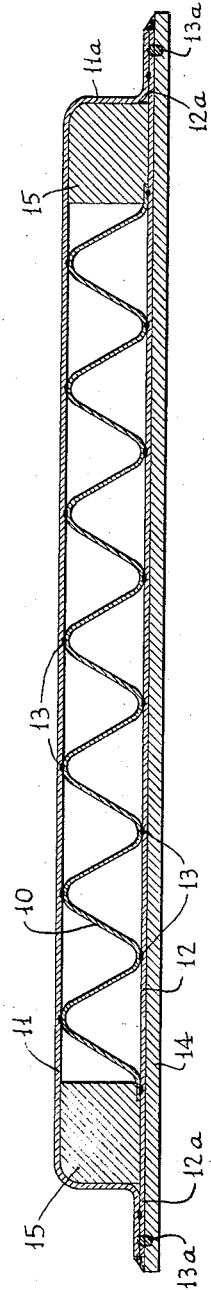
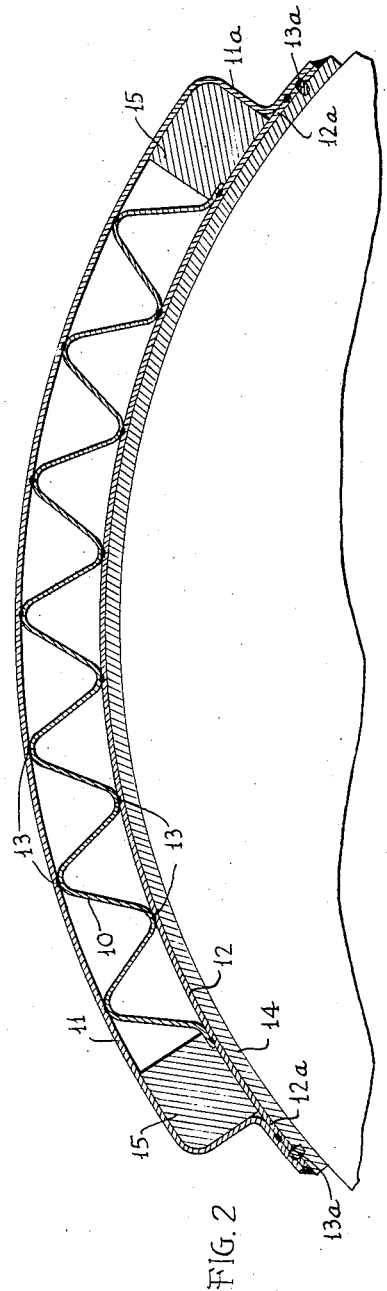
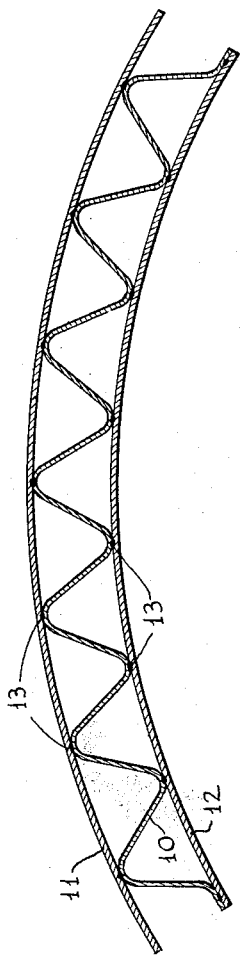
*INVENTOR.*
Michael Watter
BY
Wm. R. Glisson
*ATTORNEY*

United States Patent Office 3,060,561
Patented Oct. 30, 1962

3,060,561
METHOD OF FORMING CURVED SANDWICH PANELS
Michael Watter, Philadelphia, Pa., assignor to The Budd Company, Philadelphia, Pa., a corporation of Pennsylvania
Filed July 27, 1959, Ser. No. 829,630
3 Claims. (Cl. 29—423)

This invention relates to a method of forming curved sandwich panels and has for an object the provision of improvements in this art.

One of the particular objects of the invention is to provide a method of bending a composite panel which has previously been fabricated and to bend it without buckling and crippling it in any of its elements.

Another object is to provide a simple and inexpensive method of making curved sandwich structures.

The invention will be best understood by reference to the accompanying drawings illustrating an exemplary form of the method, wherein:

FIG. 1 is an edge section view of a fabricated sandwich structure and certain auxiliary elements used to assist bending;

FIG. 2 shows the assembly being bent; and

FIG. 3 shows the sandwich structure alone after bending.

One efficient structural unit, commonly referred to as a sandwich, comprises a suitable core of honeycomb, waffle or corrugated type and one or more skin cover sheets secured to the core by brazing, welding or gluing.

Heretofore in forming a curved sandwich panel it has been the practice to make the core and curve it to shape, curve the sheets to shape, and then secure the curved components together. It is difficult to make the parts fit together perfectly and the attachment is often faulty due to improper fit so that inferior units are produced.

I have devised one procedure wherein the assembly is welded together while supported interiorly by mandrels, bent with the mandrels still inside, then the mandrels removed. This works very well but is rather complicated and expensive for some structures.

Many airfoil shapes in aircraft and spacecraft are curved and some of these are of simple single curvature such as cylindrical or conical with no compound or reverse curvature. Attempts have been made to fabricate such units in the flat and then bend them on a form to the desired curvature. Normal bending methods when applied to delicate sandwich structures, such as are so frequently encountered now, always result in buckling the inner portion of the sandwich and crippling it.

Some improvement is noted in using stretch bending which puts the entire unit in tension during bending, but this is an expensive procedure and still causes much trouble.

According to the present invention a simpler, surer and less expensive method is provided.

As shown in FIG. 3, an exemplary curved structure comprises a corrugated core 10 and cover skin sheets 11 and 12, sheet 11 here being the outer and sheet 12 the inner with reference to the center of curvature. Attachment means in the form of resistance welds 13 are indicated by the usual convention.

A heavy doubler sheet 14 is placed on the inner side next to sheet 12 and is welded to extensions 11a, 12a which are left initially on the sheets 11 and 12. These welds are indicated at 13a. The parts 11a are bent angularly to embrace filler bars 15.

When the reinforced assembly is bent over a form 16, as shown in FIG. 2, the sandwich structure is not buckled or crippled and gives the full strength for which it was designed.

After bending has been completed the sandwich proper, as shown in FIG. 3, is cut free from the temporary bracing elements 14 and 15, the temporary extensions 11a and 12a of the sandwich cover sheets 11 and 12 being cut off at the same time.

The use of the heavy sheet on the compression side of the assembly lowers the effective elastic axis of the sandwich and in addition, by its pressure reduces the unit stress on the compressive side. The sandwich, in effect, is practically stretched in tension as it would be in stretch bending, but is not lengthened as much as it would be in stretch bending. The compression side almost maintains its original dimension—depending on the thickness and bending modulus of the temporary doubler in relation to the entire structure.

It is thus seen that the invention provides a simple inexpensive and effective method of bending fabricated sandwich panels.

While one embodiment of the invention has been described for purposes of illustration it is to be understood that there may be various embodiments and modifications within the general scope of the invention.

What is claimed is:

1. The method of curving flat pre-fabricated compressible sandwich panels comprising a fragile core element and one or more outer skin sheets, which comprises, attaching filler bars as thick as said fragile core at the ends of the panel, securing a relatively heavy doubler sheet by its ends to the ends of said panel to form an assembly, and bending the assembly over a form which places tension in the sandwich structure and compression in the doubler sheet.

2. The method as set forth in claim 1, further characterized by the fact that one of said skin sheets of said sandwich panel has extended ends covering said filler bars and secured to the doubler sheet, and later cutting off said end extensions of the outer skin sheet and removing the filler bars and doubler sheet from the bent sandwich panel.

3. The method of bending substantially flat compressible sandwich structures which comprise outer skin sheets and a fragile core comprising the steps of: connecting substantially non-compressible filler bars to end portions of said sandwich structure, attaching a heavy doubler sheet to said sandwich structure to form an assembly, and bending said assembly over a predetermined convex form to stretch shape said fragile core and said outer skins without collapsing said sandwich structure.

References Cited in the file of this patent
UNITED STATES PATENTS

| | | |
|---|---|---|
| 224,758 | Wright | Feb. 17, 1880 |
| 988,763 | Flower | Apr. 4, 1911 |
| 1,620,042 | Smith | Mar. 8, 1927 |
| 2,134,853 | Boissou | Nov. 1, 1938 |
| 2,289,311 | Wellman | July 7, 1942 |
| 2,722,261 | Bishop | Nov. 1, 1955 |
| 2,791,827 | Stiles | May 14, 1957 |
| 2,804,681 | Brueckner | Sept. 3, 1957 |
| 2,978,806 | Herbert | Apr. 11, 1961 |